US010701707B2

(12) United States Patent
Ansley (10) Patent No.: US 10,701,707 B2
(45) Date of Patent: Jun. 30, 2020

(54) ALLOCATION OF WIRELESS CHANNELS FOR PREFERRED STATIONS (71) Applicant: ARRIS Enterprises LLC, Suwanee, GA (US)

(72) Inventor: Carol J. Ansley, Johns Creek, GA (US)

(73) Assignee: ARRIS ENTERPRISES LLC, Suwanee, GA (US)

(*) Notice: Subject to any disclaimer, the term of this patent is extended or adjusted under 35 U.S.C. 154(b) by 6 days.

(21) Appl. No.: 15/471,353

(22) Filed: Mar. 28, 2017

(65) Prior Publication Data
US 2018/0288775 A1 Oct. 4, 2018

(51) Int. Cl.
H04W 72/00 (2009.01)
H04W 72/10 (2009.01)
H04W 72/04 (2009.01)
H04L 5/00 (2006.01)
H04W 88/08 (2009.01)
H04W 84/12 (2009.01)

(52) U.S. Cl.
CPC ........... H04W 72/10 (2013.01); H04L 5/0007 (2013.01); H04L 5/0037 (2013.01); H04L 5/0092 (2013.01); H04W 72/048 (2013.01); H04W 72/0453 (2013.01); H04L 5/0062 (2013.01); H04L 5/0082 (2013.01); H04W 84/12 (2013.01); H04W 88/08 (2013.01)

(58) Field of Classification Search
CPC .................................................... H04W 72/10
USPC .......................................... 455/450; 370/330
See application file for complete search history.

(56) References Cited

U.S. PATENT DOCUMENTS

| 5,933,420 | A  | * | 8/1999  | Jaszewski | H04W 16/14 |
|           |    |   |         |           | 370/329    |
| 7,634,581 | B2 | * | 12/2009 | Etoh      | H04L 47/14 |
|           |    |   |         |           | 375/130    |
| 9,788,348 | B2 | * | 10/2017 | Smith     | H04W 4/06  |
| 10,172,160 | B2 | * | 1/2019 | Wu        | H04W 74/0816 |
| 10,425,893 | B2 | * | 9/2019 | Ghosh     | H04L 5/0053 |
| 2003/0145092 | A1 | * | 7/2003 | Funato  | H04W 48/20 |
|           |    |   |         |           | 709/229    |
| 2005/0154774 | A1 | * | 7/2005 | Giaffreda | H04W 4/18 |
|           |    |   |         |           | 709/200    |

(Continued)

OTHER PUBLICATIONS

PCT International Search Report & Written Opinion, Re: Application No. PCT/US2018/020688, dated Jun. 5, 2018.

(Continued)

Primary Examiner — Charles T Shedrick
(74) Attorney, Agent, or Firm — Wenderoth, Lind & Ponack, L.L.P.

(57) ABSTRACT

Methods, systems, and computer readable media may be operable to facilitate an allocation of one or more channels to one or more preferred stations. An access point may be configured to allocate the use of one or more sub-bands of a frequency spectrum to one or more stations. One or more sub-bands may be assigned to one or more preferred stations, thereby creating a plurality of virtual networks provided by the access point. The virtual networks provided by the access point may support different authentication and encryption options. The access point may simultaneously communicate with a plurality of stations by simultaneously transmitting and/or receiving communications over the different sub-bands.

20 Claims, 7 Drawing Sheets

(56) References Cited

U.S. PATENT DOCUMENTS

| | | | |
|---|---|---|---|
| 2006/0002355 A1* | 1/2006 | Baek | H04W 36/14 370/338 |
| 2007/0140190 A1 | 6/2007 | Rensburg et al. | |
| 2008/0013482 A1* | 1/2008 | Kurokawa | H04L 45/122 370/328 |
| 2009/0323646 A1* | 12/2009 | Ketchum | H04L 25/03343 370/338 |
| 2012/0147777 A1* | 6/2012 | Arashin | H04W 72/02 370/252 |
| 2012/0294246 A1* | 11/2012 | Cariou | H04W 12/06 370/329 |
| 2013/0301605 A1* | 11/2013 | Kim | H04L 1/00 370/330 |
| 2013/0316730 A1* | 11/2013 | Ding | H04W 64/00 455/456.1 |
| 2014/0050178 A1* | 2/2014 | Asai | H04W 8/186 370/329 |
| 2014/0314054 A1* | 10/2014 | Seok | H04W 8/26 370/336 |
| 2014/0341158 A1 | 11/2014 | Farricker | |
| 2015/0365941 A1* | 12/2015 | Liu | H04W 72/0446 370/280 |
| 2016/0050567 A1* | 2/2016 | Asano | H04W 12/08 726/1 |
| 2016/0165617 A1* | 6/2016 | Sakamoto | H04W 16/14 370/329 |
| 2016/0212702 A1* | 7/2016 | Ghosh | H04W 52/0216 |
| 2016/0309469 A1* | 10/2016 | Shu | H04L 1/18 |
| 2016/0309513 A1* | 10/2016 | Ma | H04W 72/1252 |
| 2016/0330757 A1 | 11/2016 | Cherian et al. | |
| 2016/0374114 A1* | 12/2016 | Lu | H04W 72/048 |
| 2017/0048852 A1* | 2/2017 | Li | H04W 52/02 |
| 2017/0079011 A1* | 3/2017 | Kenney | H04L 1/00 |
| 2017/0201982 A1* | 7/2017 | Rico Alvarino | H04W 72/042 |
| 2017/0272696 A1* | 9/2017 | Li | H04W 72/00 |
| 2017/0289994 A1* | 10/2017 | Kim | H04W 74/002 |
| 2018/0288694 A1* | 10/2018 | Gordon | H04W 48/20 |
| 2018/0368127 A1* | 12/2018 | Kim | H04W 74/04 |
| 2019/0110285 A1* | 4/2019 | Huang | H04W 72/04 |
| 2019/0116014 A1* | 4/2019 | Gan | H04L 5/0007 |
| 2019/0297553 A1* | 9/2019 | Wang | H04W 36/08 |

OTHER PUBLICATIONS

G. Li, "Some CIDs related to 20MHz operation", IEEE Draft, vol. 802.11ax. No. 3, Mar. 13, 2017.

\* cited by examiner

ALLOCATION OF WIRELESS CHANNELS FOR PREFERRED STATIONS

TECHNICAL FIELD

This disclosure relates to an allocation of wireless channels for preferred stations.

BACKGROUND

Currently, wireless radios assign transmission opportunities at a single time to a single device. An access point might have traffic destined for several stations, but the access point is generally only able to deliver traffic to a single station at a given time. Similarly, if a plurality of stations have pending transmissions, the stations must compete to seize the air, and only one station is able to transmit a communication to an access point at a given time.

Moreover, with an increase in the number and types of stations served by an access point, the ability to offer differentiated services to the stations has become a difficult task. Further, legacy stations may not be able to use the entirety of a frequency spectrum that is available for use by an access point, and the access point might be forced to leave some portion of the frequency spectrum idle while the legacy stations are communicating. Therefore, it is desirable to improve upon methods and systems for allocating transmission opportunities amongst a plurality of stations.

BRIEF DESCRIPTION OF THE DRAWINGS

Like reference numbers and designations in the various drawings indicate like elements.

DETAILED DESCRIPTION

Methods, systems, and computer readable media may be operable to facilitate an allocation of one or more channels or sub-bands to one or more preferred stations. An access point may be configured to allocate the use of one or more sub-bands of a frequency spectrum to one or more stations. One or more sub-bands may be assigned to one or more preferred stations, thereby creating a plurality of virtual networks provided by the access point. The virtual networks provided by the access point may support different authentication and encryption options. The access point may simultaneously communicate with a plurality of stations by simultaneously transmitting and/or receiving communications over the different sub-bands.

An embodiment of the invention described herein may include a method comprising: (a) receiving a wireless communication at an access point, wherein the wireless communication is received from a station; (b) retrieving a station identifier from the wireless communication; and (c) if the retrieved station identifier matches an identifier associated with a sub-band of a frequency spectrum over which the access point is configured to communicate, outputting a communication to the station, wherein the communication instructs the station to communicate with the access point over the sub-band associated with the station identifier.

According to an embodiment of the invention, the retrieved station identifier comprises a service type identifier.

According to an embodiment of the invention, the retrieved station identifier comprises a device type identifier.

According to an embodiment of the invention, the method described herein further comprises, if the retrieved station identifier does not match an identifier associated with a sub-band of the frequency spectrum over which the access point is configured to communicate, selecting an available sub-band of the frequency spectrum and outputting a communication to the station, wherein the communication instructs the station to communicate with the access point over the selected sub-band.

According to an embodiment of the invention, the method described herein further comprises: (a) if the retrieved station identifier indicates that the station cannot accommodate sub-band communication; (b) identifying time intervals wherein said station can communicate using the complete frequency spectrum; and (c) instructing any stations capable of sub-band communication to refrain from communication that might interfere with said station.

According to an embodiment of the invention, the communication comprises configuration information associated with the sub-band associated with the station identifier.

According to an embodiment of the invention, the frequency spectrum over which the access point is configured to communicate is partitioned into at least two sub-bands.

According to an embodiment of the invention, the access point is configured to simultaneously communicate with one or more stations over each of the at least two sub-bands.

According to an embodiment of the invention, the method described herein further comprises: (a) determining that the retrieved station identifier is associated with a device category, wherein the device category is designated for communicating over a specific sub-band of the frequency spectrum; and (b) wherein the communication instructs the station to communicate with the access point over the specific sub-band.

An embodiment of the invention described herein may include an access point comprising: (a) an interface configured to be used to receive a wireless communication from a station; and (b) one or more modules configured to: (i) retrieve a station identifier from the wireless communication; and (ii) if the retrieved station identifier matches an identifier associated with a sub-band of a frequency spectrum over which the access point is configured to communicate, output a communication to the station, wherein the communication instructs the station to communicate with the access point over the sub-band associated with the station identifier.

According to an embodiment of the invention, the retrieved station identifier comprises a service type identifier.

According to an embodiment of the invention, the retrieved station identifier comprises a device type identifier.

According to an embodiment of the invention, the frequency spectrum over which the access point is configured to communicate is partitioned into at least two sub-bands, and the access point is configured to simultaneously communicate with one or more stations over each of the at least two sub-bands.

An embodiment of the invention described herein may include one or more non-transitory computer readable media having instructions operable to cause one or more processors to perform the operations comprising: (a) receiving a wireless communication at an access point, wherein the wireless communication is received from a station; (b) retrieving a station identifier from the wireless communication; and (c) if the retrieved station identifier matches an identifier associated with a sub-band of a frequency spectrum over which the access point is configured to communicate, outputting a communication to the station, wherein the communication instructs the station to communicate with the access point over the sub-band associated with the station identifier.

According to an embodiment of the invention, the retrieved station identifier comprises a service type identifier.

According to an embodiment of the invention, the retrieved station identifier comprises a device type identifier.

According to an embodiment of the invention, wherein the instructions are further operable to cause one or more processors to perform the operations comprising, if the retrieved station identifier does not match an identifier associated with a sub-band of the frequency spectrum over which the access point is configured to communicate, selecting an available sub-band of the frequency spectrum and outputting a communication to the station, wherein the communication instructs the station to communicate with the access point over the selected sub-band.

According to an embodiment of the invention, the communication comprises configuration information associated with the sub-band associated with the station identifier.

According to an embodiment of the invention, the frequency spectrum over which the access point is configured to communicate is partitioned into at least two sub-bands.

According to an embodiment of the invention, the access point is configured to simultaneously communicate with one or more stations over each of the at least two sub-bands.

Figure 1:
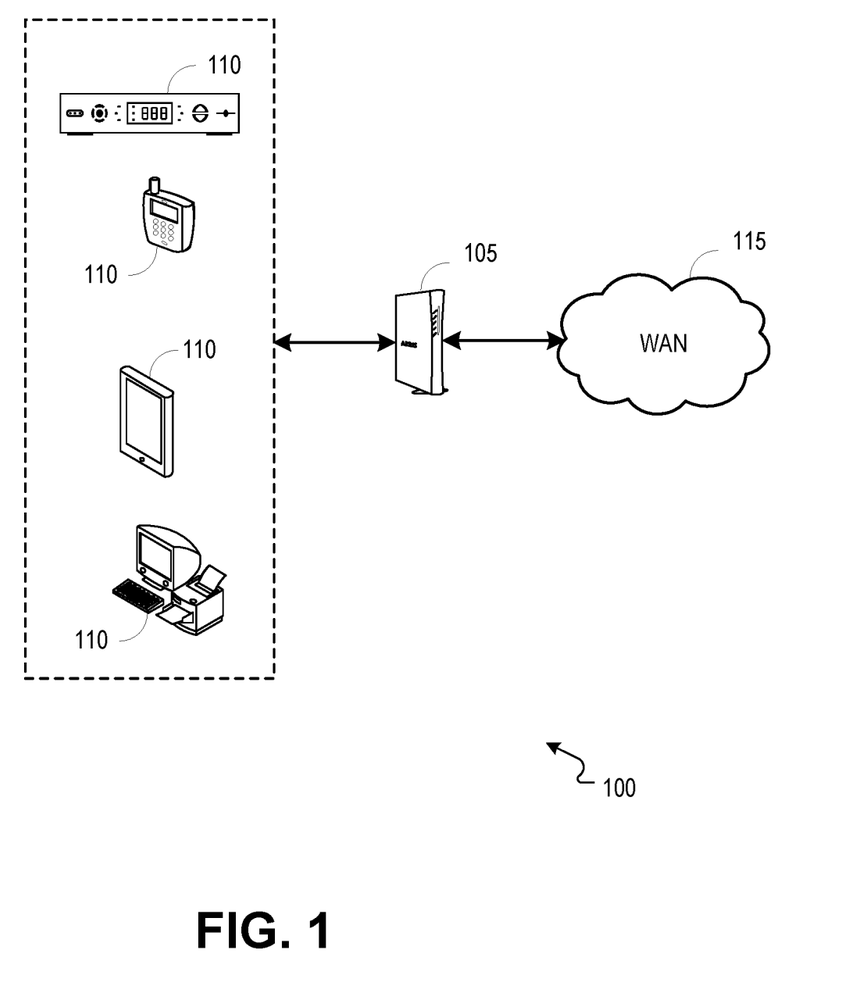
FIG. 1 is a block diagram illustrating an example network environment operable to facilitate an allocation of one or more channels to one or more preferred stations.

FIG. 1 is a block diagram illustrating an example network environment 100 operable to facilitate an allocation of one or more channels or sub-bands to one or more preferred stations. In embodiments, an access point 105 may route communications to and from one or more stations 110. For example, the one or more stations 110 may be provisioned to receive video service(s), data service(s), voice services, and/or other services through one or more access points 105. In embodiments, an access point 105 may include a gateway, a cable modem, a wireless router including an embedded cable modem, a mobile hot-spot router, a multimedia over coaxial alliance (MoCA) node, a wireless extender, and any other device that is operable to route communications to and from a station 110.

In embodiments, stations 110 may include a wide variety of devices such as televisions, mobile devices, tablets, set-top boxes, computers, thermostats or other sensors, and any other device that is capable of utilizing a video, data, telephony, or other service.

In embodiments, an access point 105 may route communications between stations 110 and a wide area network (WAN) 115 via a subscriber network. The subscriber network may include various networks such as coaxial cable, optical fiber, twisted pair network, wireless networks including 4G and LTE, and others.

In embodiments, an access point 105 may transmit and receive communications over one or more blocks of pre-defined frequency spectrum (e.g., 2.4 GHz, 5 GHz, etc.), and the access point 105 may communicate with a plurality of stations 110 simultaneously by communicating with the stations 110 over a plurality of sub-bands (e.g., channels or resource units within defined channels) of the frequency spectrum. For example, the access point 105 may pass a first communication to a first station over a first portion of the frequency spectrum (e.g., a first channel), and the access point 105 may simultaneously pass a second communication to a second station over a second portion of the frequency spectrum (e.g., a collection of resource units within a second channel). It should be understood that each of the sub-bands of a frequency spectrum may have the same, or may have different frequency bandwidths.

In embodiments, one or more sub-bands (e.g., channels or resource units within a defined channel) of a frequency spectrum of an access point 105 may be assigned to one or more preferred stations 110. One or more sub-bands may be allocated to preferred stations 110, for example, by a technician, subscriber, or other entity, and/or the allocation may be made according to a predefined set of rules. A sub-band may be assigned to one or more specific stations 110, one or more specific uses, or one or more specific device types. For example, an access point 105 may be configured to allow specific devices, certain uses (e.g., service type), device types, or other identifiers of stations 110 to communicate with the access point 105 over a specific sub-band.

In embodiments, when a station 110 attempts to connect to an access point 105, the access point 105 may retrieve an identifier from a communication (e.g., a wireless communication such as an 802.11 packet) received from the station 110. The identifier may include an identifier specific to the station 110 (e.g., media access control (MAC) address), one or more configuration parameters associated with the station 110, a use or service type associated with the received communication, a device type identifier associated with the station 110, and others. The access point 105 may compare the retrieved identifier to identifiers that are designated for using a specific sub-band. If the retrieved identifier matches an identifier designated for using a specific sub-band, the access point 105 may output a communication to the station 110, wherein the communication instructs the station 110 to output upstream communications, and/or receive downstream communications, over the specific sub-band.

In embodiments, the access point 105 may designate one or more device categories for communicating over one or more sub-bands. The access point 105 may create a device category based upon device type, service type, or other parameter associated with a category of devices. For example, the access point 105 may create a device category that includes IoT devices, a device category that includes video streaming devices, and/or other categories of devices, and the access point 105 may designate each device category for communicating over a specific sub-band. The access point 105 may associate each device category with one or more certain device identifiers (e.g., device type identifiers, service type identifiers, etc.) that are to be added to the device category. When a station 110 attempts to connect to the access point 105, the access point 105 may retrieve an identifier from the communication, and using the identifier, the access point 105 may associate the station 110 with a device category. For example, the retrieved identifier may be a device type, service type, or other identifier, and the access point 105 may associate the station 110 with a device category that is associated with the retrieved identifier. When the station 110 is associated with a device category, the station 110 may be configured to communicate over the sub-band designated for use by the device category. A station 110 may be generically capable of communicating across a normal wireless band, or the station 110 may be advantageously designed to operate within an expected sub-band assignment. The frequency bandwidth expectations of a station 110 may influence the station identifiers transmitted with its communications.

In embodiments, when a determination is made to instruct a station 110 to communicate over a certain sub-band, the access point 105 may output a communication to the station 110, wherein the communication includes one or more configuration parameters associated with the certain sub-band. For example, configuration parameters unique to a certain sub-band may include various authentication options, encryption options, and others.

Figure 2:
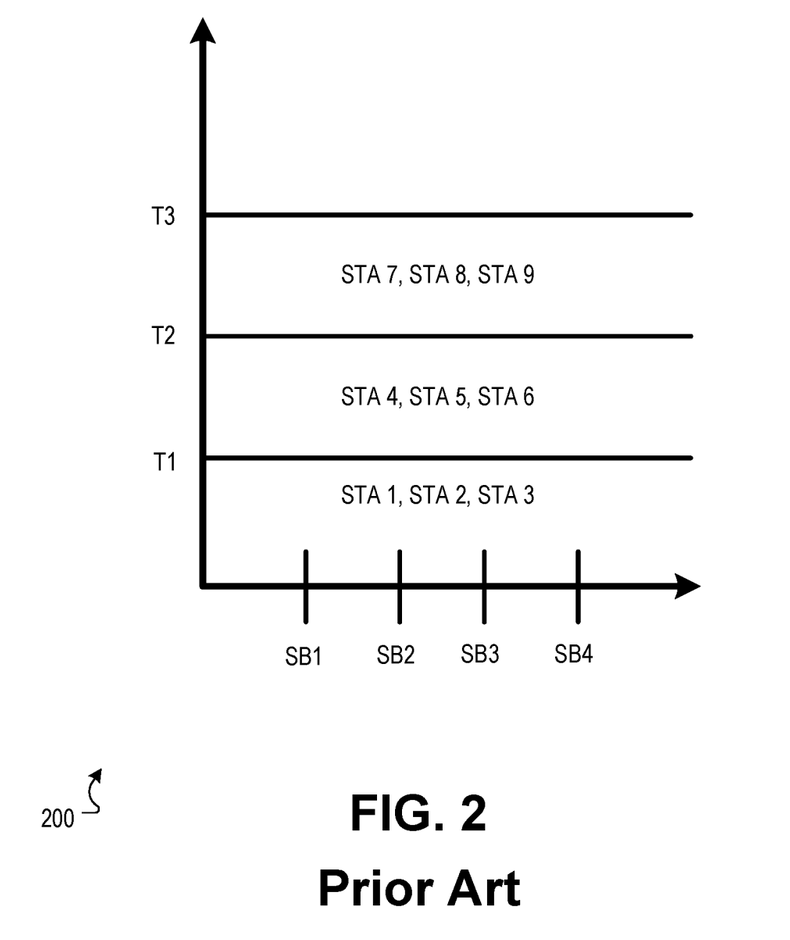
FIG. 2 is a prior art time versus channel chart that shows a prior art allocation of airtime to a plurality of stations.

FIG. 2 is a prior art time versus channel chart 200 that shows a prior art allocation of airtime to a plurality of stations. In embodiments, an access point (e.g., access point 105 of FIG. 1) may communicate over a frequency spectrum that includes a plurality of sub-bands (e.g., channels such as SB1, SB2, SB3, SB4, etc.). According to the prior art, an access point will use the entire frequency spectrum to transmit or receive a wireless communication, thus the access point will only be able to transmit or receive a single wireless communication at a given time. For example, each possible sub-band (e.g., sub-bands (SB) 1-4) of the frequency spectrum would be occupied by a single wireless communication that is either transmitted to or received from a station (e.g., station 110 of FIG. 1). According to the example allocation of airtime shown by the prior art time versus channel chart 200, the entirety of the frequency spectrum may be reserved for communicating with a station of a first group of stations (e.g., STA 1, STA 2, and STA 3) during a first time period (e.g., T1), a station of a second group of stations (e.g., STA 4, STA 5, and STA 6) during a second time period (e.g., T2), and a station of a third group of stations (e.g., STA 7, STA 8, and STA 9) during a third time period (e.g., T3). The use of spatial multiplexing may allow the access point to communicate with more than one station during a time interval, such as T1, but the entire frequency band is still in use by each spatially diverse transmission.

Figure 3:
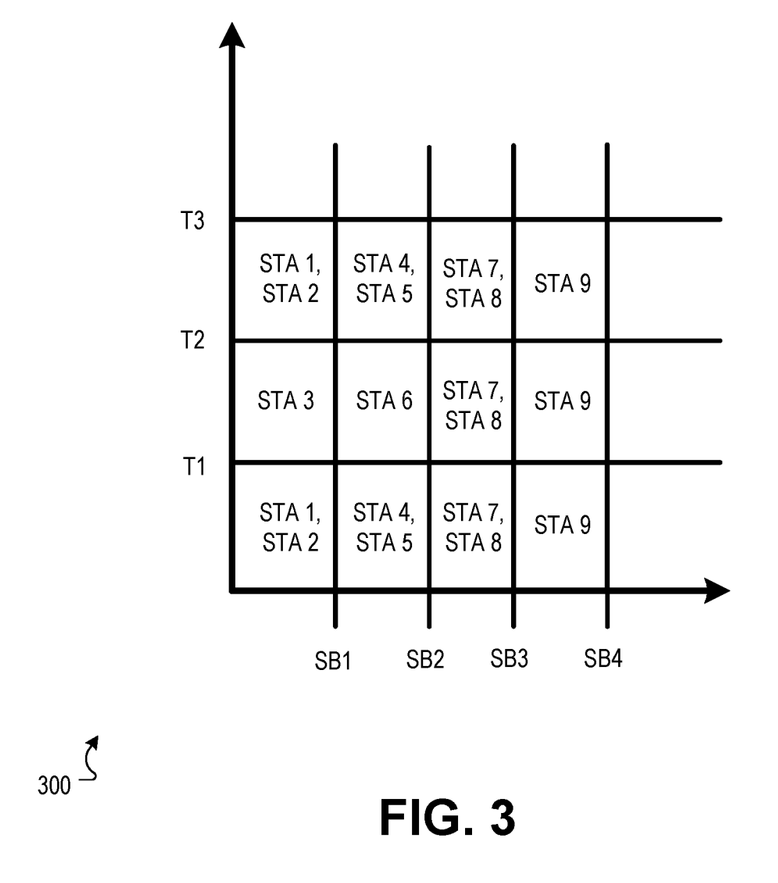
FIG. 3 is an example time versus channel chart that shows an allocation of sub-bands of a frequency spectrum to one or more stations.

FIG. 3 is an example time versus channel chart 300 that shows an allocation of sub-bands of a frequency spectrum to one or more stations. In embodiments, an access point (e.g., access point 105 of FIG. 1) may partition a frequency spectrum into a plurality of sub-bands (e.g., sub-bands (SB) 1-4). The access point may allocate one or more of the sub-bands for carrying wireless communications to and/or from one or more specific stations (e.g., stations 110 of FIG. 1). For example, wireless communications may be transmitted to and/or from a designated station over a sub-band of the frequency spectrum at multiple or all instances (e.g., time periods T1-3), and the access point 105 may simultaneously transmit to, and/or receive wireless communications from multiple stations (e.g., STAs 1-9) over different sub-bands. According to the example time versus channel chart 300, the access point 105 may simultaneously transmit to, and/or receive wireless communications from one or more stations of a first group of stations (e.g., STA 1, STA 2, and STA 3) over a first sub-band (e.g., SB1), one or more stations of a second group of stations (e.g., STA 4, STA 5, and STA 6) over a second sub-band (e.g., SB2), one or more stations of a third group of stations (e.g., STA 7 and STA 8) over a third sub-band (e.g., SB3), and one or more stations (e.g., STA 9) over a fourth sub-band (e.g., SB4). In embodiments, the bandwidth allocated to sub-bands supporting one or more stations may vary greatly.

Figure 4:
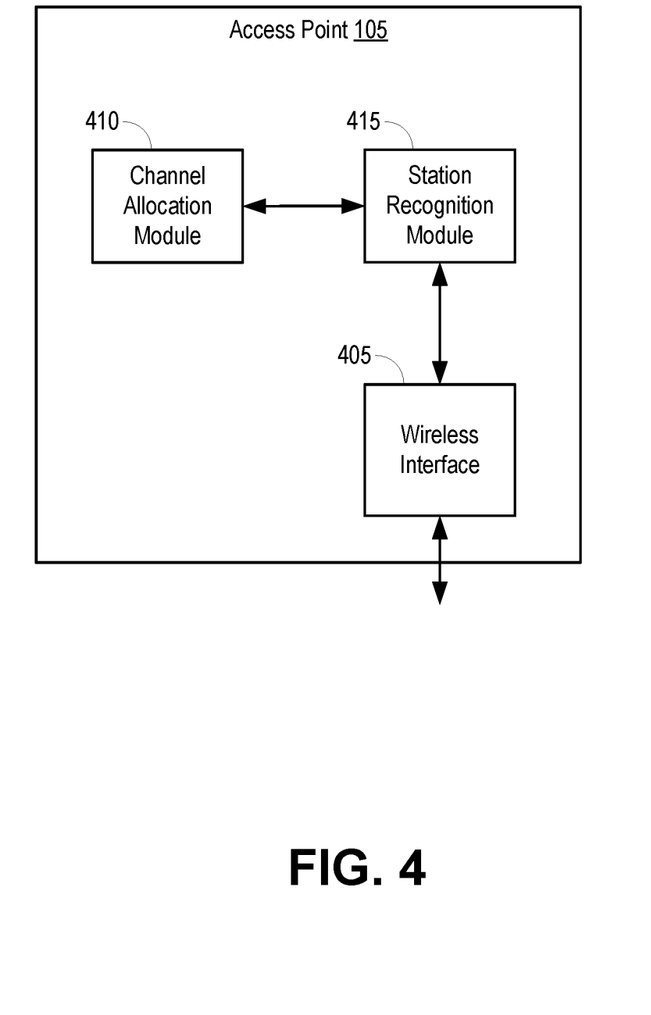
FIG. 4 is a block diagram illustrating an example access point operable to facilitate an allocation of one or more channels to one or more preferred stations.

FIG. 4 is a block diagram illustrating an example access point 105 operable to facilitate an allocation of one or more channels to one or more preferred stations. The access point 105 may include a wireless interface 405, a channel allocation module 410, and a station recognition module 415.

In embodiments, the access point 105 may transmit communications to, and receive communications from one or more stations (e.g., stations 110 of FIG. 1) through the wireless interface 405. Through the wireless interface 405, the access point 105 may transmit and receive communications over a predefined frequency spectrum (e.g., 2.4 GHz, 5 GHz, etc.), and the access point 105 may communicate with a plurality of stations 110 simultaneously by communicating with the stations 110 over a plurality of sub-bands (e.g., channels) of the frequency spectrum. For example, the access point 105 may pass a first communication to a first station over a first portion of the frequency spectrum (e.g., a first channel), and the access point 105 may simultaneously pass a second communication to a second station over a second portion of the frequency spectrum (e.g., a second channel). It should be understood that communications exchanged between the access point 105 and station(s) 110 may include wireless communications (e.g., 802.11 packet exchanges).

In embodiments, one or more sub-bands (e.g., channels) of a frequency spectrum of an access point 105 may be assigned to one or more preferred stations 110. The channel allocation module 410 may manage and store allocations of one or more sub-bands to one or more preferred stations 110. For example, the channel allocation module 410 may be configured with device, use (e.g., service type), device type, or other identifiers of stations 110 that are to communicate with the access point 105 over a specific sub-band.

In embodiments, when a station 110 attempts to connect to the access point 105, the station recognition module 415 may retrieve an identifier from a communication (e.g., a wireless communication such as an 802.11 packet) received from the station 110. The identifier may include an identifier specific to the station 110 (e.g., media access control (MAC) address), one or more configuration parameters associated with the station 110, a use or service type associated with the received communication, a device type identifier associated with the station 110, and others. The station recognition module 415 may compare the retrieved identifier to identifiers that are designated for using a specific sub-band. If the retrieved identifier matches an identifier designated for using a specific sub-band, the station recognition module 415 may output a communication to the station 110, wherein the communication instructs the station 110 to output upstream communications, and/or receive downstream communications, over the specific sub-band.

In embodiments, when a determination is made to instruct a station 110 to communicate over a certain sub-band, the station recognition module 415 may output a communication to the station 110, wherein the communication includes one or more configuration parameters associated with the certain sub-band. For example, configuration parameters unique to a certain sub-band may include various authentication options, encryption options, and others.

Figure 5:
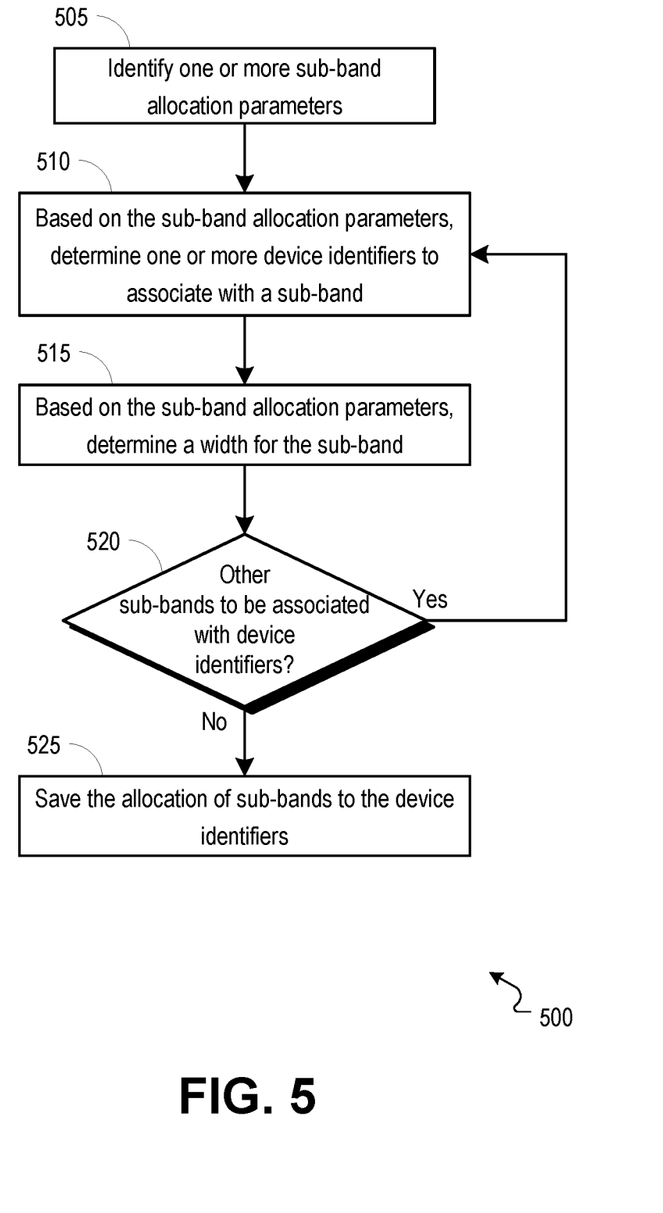
FIG. 5 is a flowchart illustrating an example process operable to facilitate an allocation of one or more channels to one or more preferred stations.

FIG. 5 is a flowchart illustrating an example process 500 operable to facilitate an allocation of one or more channels to one or more preferred stations. In embodiments, an access point 105 of FIG. 1 may be configured with an allocation of one more sub-bands (e.g., channels) to one or more preferred stations (e.g., stations 110 of FIG. 1). The process 500 may begin at 505, when one or more sub-band allocation parameters are identified. The one or more sub-band allocation parameters may be identified, for example, by the access point 105 (e.g., at a channel allocation module 410 of FIG. 4). In embodiments, the one or more sub-band allocation parameters may include a default set of rules for allocating sub-bands to stations, one or more configuration parameters for an allocation of sub-bands to specific stations, and/or other parameters or settings. For example, the one or more allocation parameters may provide that certain types of stations (e.g., video devices, IoT devices, etc.) be assigned to communicate over the same sub-band. As another example, the one or more allocation parameters may provide that a sub-band allocated to one or more stations of a certain type be given a certain bandwidth (e.g., sub-bands allocated to IoT devices may be given a smaller bandwidth than sub-bands allocated to other uses or device types).

At 510, one or more device identifiers may be determined for association with a sub-band, wherein the determination of the one or more device identifiers is based upon the sub-band allocation parameters. The determination of the one or more device identifiers to be associated with the sub-band may be made, for example, by the access point 105 (e.g., at a channel allocation module 410). In embodiments, the channel allocation module 410 may select an identifier associated with a specific station or one or more identifiers associated with a group of stations to be associated with a specific sub-band. For example, the one or more identifiers may be selected such that a specific station or specific group of stations is designated for communicating over the specific sub-band. In embodiments, the determination may be made that a device category is to be associated with a specific sub-band. For example, the channel allocation module 410 may select an identifier associated with a device category (e.g., device type identifier, service type identifier, etc.), wherein devices falling within the device category (e.g., devices having an identifier that matches the selected identifier) are designated for communicating with the access point 105 over the specific sub-band. A station 110 may be generically capable of communicating across a normal wireless band, or the station 110 may be advantageously designed to operate within an expected sub-band assignment. The frequency bandwidth expectations of a station 110 may influence the station identifiers transmitted with its communications.

At 515, a bandwidth for the sub-band may be determined based on the sub-band allocation parameters. The bandwidth for the sub-band may be determined, for example, by the access point 105 (e.g., at a channel allocation module 410). In embodiments, the bandwidth for the sub-band may be determined based upon the station(s) designated for communicating over the sub-band and may be determined according to the sub-band allocation parameters. Sub-band allocation parameters may dictate that one or more certain stations are to be designated for communicating over a narrower sub-band than a sub-band over which one or more other stations are designated for communicating. For example, a sub-band allocated for delivery of communications between the access point 105 and one or more IoT devices may be given a narrower bandwidth than a sub-band allocated for delivery of communications between the access point 105 and one or more video devices.

At 520, a determination may be made whether one or more other sub-bands are to be associated with one or more device identifiers. The determination whether one or more other sub-bands are to be associated with one or more device identifiers may be made, for example, by the access point 105 (e.g., at a channel allocation module 410). In embodiments, the determination whether one or more other sub-bands are to be associated with one or more device identifiers may be based upon the one or more sub-band allocation parameters, a user input of a decision to associate another sub-band with one or more identifiers, or other factors.

If, at 520, the determination is made to associate another sub-band with one or more other identifiers, the process 500 may return to 510 where one or more device identifiers may be selected for association with another sub-band.

If, at 520, the determination is made not to associate another sub-band with one or more other identifiers, the process 500 may proceed to 525. At 525, the allocation of sub-bands to the device identifiers may be saved. The allocation of sub-bands to the device identifiers may be saved, for example, at the access point 105 (e.g., at the channel allocation module 410).

Figure 6:
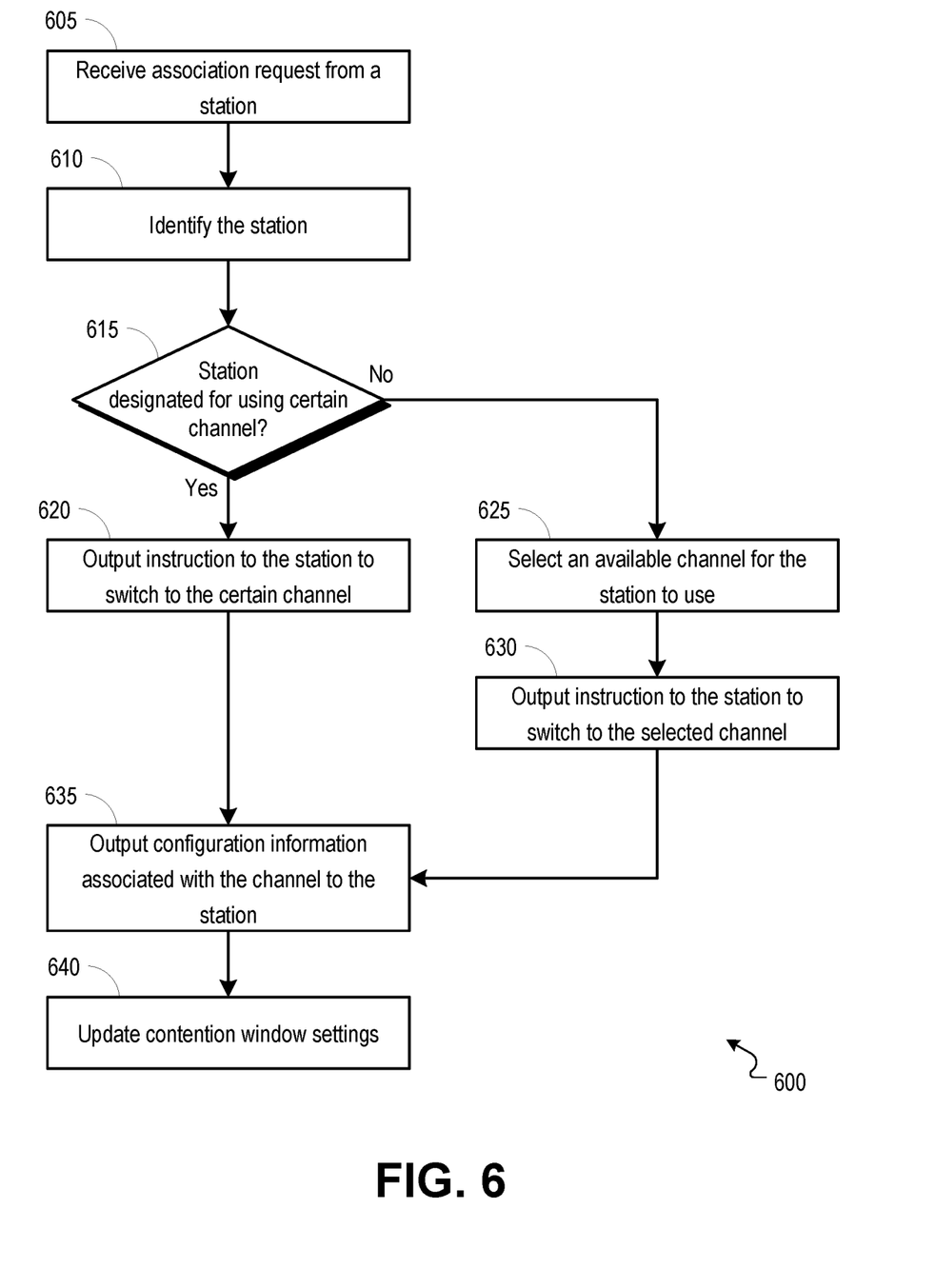
FIG. 6 is a flowchart illustrating an example process operable to facilitate an assignment of a station to an allocated sub-band of a frequency spectrum.

FIG. 6 is a flowchart illustrating an example process 600 operable to facilitate an assignment of a station to an allocated sub-band of a frequency spectrum. In embodiments, an access point 105 of FIG. 1 may control an assignment of a station (e.g., station 110 of FIG. 1) to a specific sub-band. The process 600 may begin at 605, when an association request is received from a station. The association request may be received at an access point 105 (e.g., by a station recognition module 415 of FIG. 4).

At 610, the station from which the association request was received may be identified. The station may be identified, for example, by the access point 105 (e.g., by a station recognition module 415). In embodiments, the station recognition module 415 may identify the station by retrieving an identifier carried by a communication received from the station (e.g., the association request). For example, the identifier may include an identifier specific to the station (e.g., media access control (MAC) address), one or more configuration parameters associated with the station, a use or service type associated with the received communication, a device type identifier associated with the station, and others.

At 615, a determination may be made whether the station from which the association request was received is designated for using a certain sub-band (e.g., channel). The determination whether the station is designated for using a certain sub-band may be made, for example, by the access point 105 (e.g., by a station recognition module 415). In embodiments, the station recognition module 415 may compare the retrieved identifier associated with the station to one or more identifiers that are designated for using a certain sub-band. For example, associations between device identifiers and sub-bands may be stored at the access device 105 (e.g., at a channel allocation module 410 of FIG. 4), and the station recognition module 415 may search for the retrieved identifier amongst the identifiers stored at the access device 105. In embodiments, the station recognition module 415 may utilize a two-step process for determining whether the station is designated for using a certain sub-band. First, the station recognition module 415 may determine whether the station belongs to a device category. For example, the station recognition module 415 may compare an identifier retrieved from the communication received from the station to one or more identifiers associated with one or more device categories (e.g., categories including device types, service types, etc.). A station may advertise identifiers that indicate communication preferences, such as desired sub-band or sub-bandwidths that the station's recognition module 415 may relate to one or more device categories. If the station recognition module 415 determines that the station is associated with a device category, the station may be added to the device category, and the station may be designated for communicating over a sub-band that is associated with the device category. For example, the station recognition module 415 may add an identifier associated with the station to a category of devices that are designated for communicating over the specific sub-band.

If, at 615, the determination is made that the station is designated for using a certain sub-band, the process 600 may proceed to 620. At 620, the station may be instructed to switch to the certain sub-band (e.g., channel). An instruction to switch to the certain sub-band may be output to the station, for example, from the access point 105 (e.g., from the station recognition module 415). In embodiments, the instruction may identify the specific sub-band over which the station is designated for communicating with the access point 105.

If, at 615, the determination is made that the station is not designated for using a certain sub-band, the process 600 may proceed to 625. At 625, an available sub-band (e.g., channel) may be selected for use by the station. The available sub-band may be selected, for example, by the access point 105 (e.g., by a station recognition module 415). In embodiments, the selected sub-band may be a sub-band that is designated for unknown stations or stations that otherwise have not been designated for using a specific sub-band. In other embodiments, the station may be identified as one not supporting sub-band assignments. Stations not capable of supporting sub-band assignments may be directed to use channel assignments designated for such stations (e.g., legacy stations).

At 630, the station may be instructed to switch to the selected sub-band (e.g., channel). An instruction to switch to the selected sub-band may be output to the station, for example, from the access point 105 (e.g., from the station recognition module 415). In embodiments, the instruction may identify the selected sub-band over which the station is designated for communicating with the access point 105.

At 635, configuration information associated with the specific/selected sub-band may be output to the station. Configuration information associated with the sub-band may be output to the station (e.g., station 110 of FIG. 1), for example, by the access point 105 (e.g., by the station recognition module 415). In embodiments, the configuration information may be output to the station as one or more configuration parameters included within the instruction output to the station (e.g., the instruction output to the station at 620 or 630). Configuration information associated with the certain/selected sub-band may include various authentication options, encryption options, and others.

At 640, contention window settings may be updated according to the designation of the station for communication over the specific/selected sub-band. The contention window settings may be updated, for example, at the access point 105 (e.g., at a channel allocation module 410). In embodiments, the contention window settings may be updated to schedule one or more transmission opportunities for the station to communicate over the specific/selected sub-band.

Figure 7:
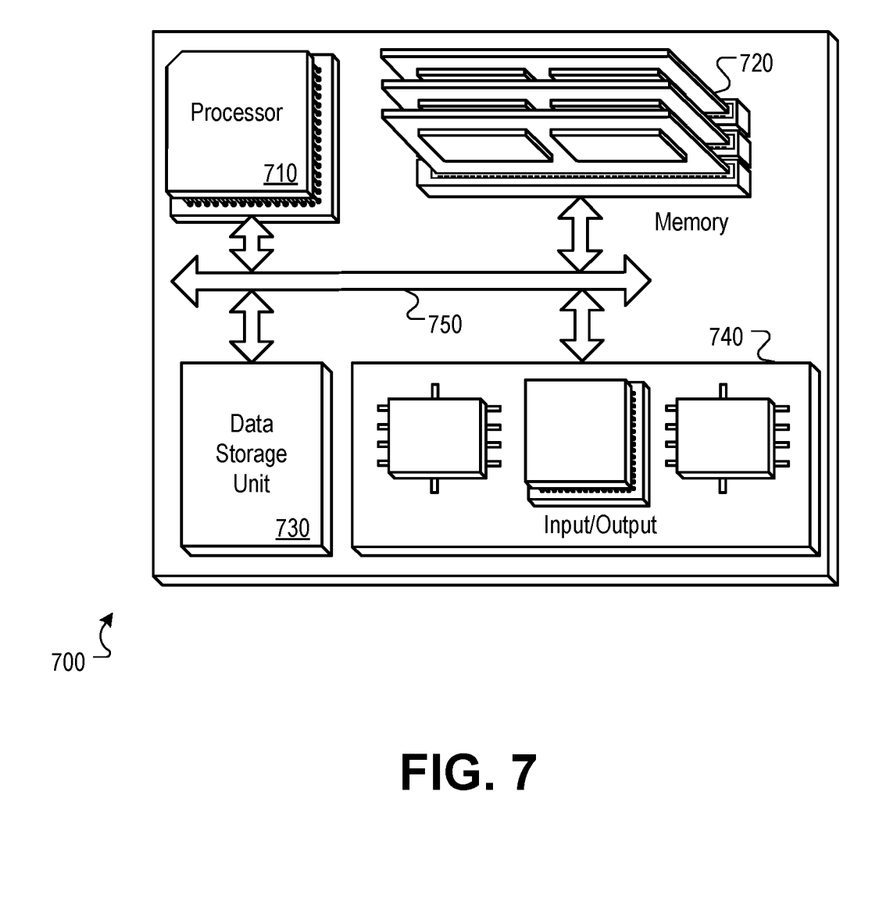
FIG. 7 is a block diagram of a hardware configuration operable to facilitate an allocation of one or more channels to one or more preferred stations.

FIG. 7 is a block diagram of a hardware configuration 700 operable to facilitate an allocation of one or more channels to one or more preferred stations. It should be understood that the hardware configuration 700 can exist in various types of devices. The hardware configuration 700 can include a processor 710, a memory 720, a storage device 730, and an input/output device 740. Each of the components 710, 720, 730, and 740 can, for example, be interconnected using a system bus 750. The processor 710 can be capable of processing instructions for execution within the hardware configuration 700. In one implementation, the processor 710 can be a single-threaded processor. In another implementation, the processor 710 can be a multi-threaded processor. The processor 710 can be capable of processing instructions stored in the memory 720 or on the storage device 730.

The memory 720 can store information within the hardware configuration 700. In one implementation, the memory 720 can be a computer-readable medium. In one implementation, the memory 720 can be a volatile memory unit. In another implementation, the memory 720 can be a non-volatile memory unit.

In some implementations, the storage device 730 can be capable of providing mass storage for the hardware configuration 700. In one implementation, the storage device 730 can be a computer-readable medium. In various different implementations, the storage device 730 can, for example, include a hard disk device, an optical disk device, flash memory or some other large capacity storage device. In other implementations, the storage device 730 can be a device external to the hardware configuration 700.

The input/output device 740 provides input/output operations for the hardware configuration 700. In embodiments, the input/output device 740 can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). In embodiments, the input/output device can include driver devices configured to send communications to, and receive communications from one or more stations 110 of FIG. 1, and/or one or more networks (e.g., subscriber network, WAN, LAN, etc.).

Those skilled in the art will appreciate that the invention improves upon methods and apparatuses for allocating communication mediums to stations. Methods, systems, and computer readable media may be operable to facilitate an allocation of one or more channels to one or more preferred stations. An access point may be configured to allocate the use of one or more sub-bands of a frequency spectrum to one or more stations. One or more sub-bands may be assigned to one or more preferred stations, thereby creating a plurality of virtual networks provided by the access point. The virtual networks provided by the access point may support different authentication and encryption options. The access point may simultaneously communicate with a plurality of stations by simultaneously transmitting and/or receiving communications over the different sub-bands.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

I claim:

1. A method comprising:
    receiving a wireless communication at an access point, wherein the wireless communication is received from a station, and wherein the access point is configured to communicate over one or more predefined frequency spectrums;
    retrieving a station identifier from the wireless communication;
    comparing the station identifier to one or more identifiers that are designated for using one or more specific resource units within a predefined frequency spectrum over which the access point is configured to communicate;
    when the retrieved station identifier matches an identifier associated with one or more resource units within a predefined frequency spectrum over which the access point is configured to communicate, outputting a communication to the station, wherein the communication instructs the station to communicate with the access point over the one or more resource units associated with the station identifier; and
    allocating a certain bandwidth to the one or more resource units, the allocation being based upon a device type associated with the station.

2. The method of claim 1, wherein the retrieved station identifier comprises a service type identifier.

3. The method of claim 1, wherein the retrieved station identifier comprises a device type identifier.

4. The method of claim 1, further comprising:
    when the retrieved station identifier does not match an identifier associated with one or more resource units within a predefined frequency spectrum over which the access point is configured to communicate, selecting one or more available resource units within a predefined frequency spectrum over which the access point is configured to communicate, and outputting a communication to the station, wherein the communication instructs the station to communicate with the access point over the selected one or more resource units.

5. The method of claim 1, further comprising:
    when the retrieved station identifier indicates that the station cannot accommodate sub-band communication;

identifying time intervals wherein said station can communicate using the complete frequency spectrum; and
instructing any stations capable of sub-band communication to refrain from communication that might interfere with said station.

6. The method of claim 1, wherein the communication comprises configuration information associated with the one or more resource units associated with the station identifier.

7. The method of claim 1, wherein a predefined frequency spectrum over which the access point is configured to communicate is partitioned into at least two sub-bands.

8. The method of claim 7, wherein the access point is configured to simultaneously communicate with one or more stations over each of the at least two sub-bands.

9. The method of claim 1, further comprising:
determining that the retrieved station identifier is associated with a device category, wherein the device category is designated for communicating over a specific sub-band of a predefined frequency spectrum; and
wherein the communication instructs the station to communicate with the access point over the specific sub-band.

10. An access point comprising:
an interface configured to be used to receive a wireless communication from a station, and transmit and receive communications over one or more predefined frequency spectrums; and
one or more modules configured to:
retrieve a station identifier from the wireless communication;
compare the station identifier to one or more identifiers that are designated for using one or more specific resource units of a predefined frequency spectrum;
when the retrieved station identifier matches an identifier associated with one or more resource units of a predefined frequency spectrum, output a communication to the station, wherein the communication instructs the station to communicate with the access point over the one or more resource units associated with the station identifier; and
allocate a certain bandwidth to the one or more resource units, the allocation being based upon a device type associated with the station.

11. The access point of claim 10, wherein the retrieved station identifier comprises a service type identifier.

12. The access point of claim 10, wherein the retrieved station identifier comprises a device type identifier.

13. The access point of claim 10, wherein a predefined frequency spectrum is partitioned into at least two sub-bands, and wherein the interface is configured to simultaneously communicate with one or more stations over each of the at least two sub-bands.

14. One or more non-transitory computer readable media having instructions operable to cause one or more processors to perform the operations comprising:
receiving a wireless communication at an access point, wherein the wireless communication is received from a station, and wherein the access point is configured to communicate over one or more predefined frequency spectrums;
retrieving a station identifier from the wireless communication;
comparing the station identifier to one or more identifiers that are designated for using one or more specific resource units of a predefined frequency spectrum over which the access point is configured to communicate;
when the retrieved station identifier matches an identifier associated with one or more resource units of a predefined frequency spectrum over which the access point is configured to communicate, outputting a communication to the station, wherein the communication instructs the station to communicate with the access point over the one or more resource units associated with the station identifier; and
allocating a certain bandwidth to the one or more resource units, the allocation being based upon a device type associated with the station.

15. The one or more non-transitory computer-readable media of claim 14, wherein the retrieved station identifier comprises a service type identifier.

16. The one or more non-transitory computer-readable media of claim 14, wherein the retrieved station identifier comprises a device type identifier.

17. The one or more non-transitory computer-readable media of claim 14, wherein the instructions are further operable to cause one or more processors to perform the operations comprising:
when the retrieved station identifier does not match an identifier associated with one or more resource units of a predefined frequency spectrum over which the access point is configured to communicate, selecting one or more available resource units of a predefined frequency spectrum and outputting a communication to the station, wherein the communication instructs the station to communicate with the access point over the selected one or more resource units.

18. The one or more non-transitory computer-readable media of claim 14, wherein the communication comprises configuration information associated with the one or more resource units associated with the station identifier.

19. The one or more non-transitory computer-readable media of claim 14, wherein a predefined frequency spectrum over which the access point is configured to communicate is partitioned into at least two sub-bands.

20. The one or more non-transitory computer-readable media of claim 19, wherein the access point is configured to simultaneously communicate with one or more stations over each of the at least two sub-bands.

* * * * *